United States Patent

Albrecht et al.

[11] Patent Number: 5,822,151
[45] Date of Patent: Oct. 13, 1998

[54] DISK DRIVE APPARATUS

[75] Inventors: David W. Albrecht, San Jose, Calif.; Tatsuo Nakamoto, Sagamihara; Shingo Tsuda, Yokohama, both of Japan

[73] Assignee: International Business Machines Corporation, Armonk, N.Y.

[21] Appl. No.: 677,158

[22] Filed: Jul. 9, 1996

[30] Foreign Application Priority Data

Sep. 27, 1995 [JP] Japan .................................... 7-249676

[51] Int. Cl.⁶ .................................................. G11B 17/02
[52] U.S. Cl. .................................... 360/98.08; 360/99.12; 360/99.05
[58] Field of Search ........................... 360/98.08, 99.12, 360/99.05

[56] References Cited

U.S. PATENT DOCUMENTS

| | | | |
|---|---|---|---|
| 4,205,357 | 5/1980 | Barton et al. | 360/135 |
| 4,561,035 | 12/1985 | McDorman et al. | 360/137 |
| 4,853,924 | 8/1989 | Takahashi et al. | 369/270 |
| 5,295,030 | 3/1994 | Tafreshi | 360/99.12 |
| 5,426,548 | 6/1995 | Fujii et al. | 360/98.08 |
| 5,459,627 | 10/1995 | Peter | 360/98.08 |
| 5,490,024 | 2/1996 | Briggs et al. | 360/99.12 |
| 5,493,462 | 2/1996 | Peter | 360/99.12 |
| 5,497,281 | 3/1996 | Jewell et al. | 360/98.08 |
| 5,517,376 | 5/1996 | Green | 360/98.08 |

OTHER PUBLICATIONS

IBM TDB vol. 20, No. 10 Mar. 1978 "Eliminating Clamp Induced Stresses in Disk Stacks" by B. Beye, p. 4107.

*Primary Examiner*—Stuart S. Levy
*Assistant Examiner*—William J. Klimowicz
*Attorney, Agent, or Firm*—Noreen A. Krall

[57] ABSTRACT

The present invention provides an improvement to a clamp in a disk drive. Insertion holes are formed in the clamp, and screws are inserted into the insertion holes to fasten the clamp to the spindle. The bottom of the screw head contacts the clamp surface to apply a force to the clamp. However, the clamp does not contact the entire bottom surface of the screw head. Only a portion of the bottom surface of the screw head contacts the clamp to apply a force to the clamp. Since the force caused by tightening the screw is applied only to the area contacting the screw, the force diffuses in a non-contact area in an outer portion of the clamp. Therefore, disk distortion and deformation are decreased.

9 Claims, 5 Drawing Sheets

DISK DRIVE APPARATUS

BACKGROUND OF THE INVENTION

1. Field of the Invention

The present invention relates to disk drive storage systems, and in particular to an apparatus for firmly and uniformly affixing disks to a rotatable spindle in a disk drive.

2. Description of the Prior Art

Magnetic disk drives are information storage devices which utilize at least one rotatable magnetic media disk, mounted on a rotating spindle, having concentric data tracks defined for storing data, a read/write transducer, or head, for reading data from and/or writing data to the various data tracks, a slider for supporting the head adjacent the data tracks typically in a flying mode above the storage media, a suspension assembly for resiliently supporting the slider and the head over the data tracks, and a positioning actuator coupled to the head/slider/suspension combination for moving the head across the media to the desired data track and maintaining the head over the data track center line during a read or write operation. The head is attached to or formed integrally with the slider which supports the head above the data surface of the storage disk by a cushion of air, referred to as an air bearing, generated by the rotating disk.

Alternatively, the head may operate in contact with the surface of the disk. The suspension provides slider loading and dimensional stability between the slider and the actuator arm which couples the head/slider/suspension assembly to the actuator. The suspension is required to maintain the head and the slider adjacent the data surface of the disk. The actuator positions the head over correct track according to the data desired on a read operation or to the correct track for the placement of data during a write operation. The actuator is controlled to position the head over the desired data track by shifting the combination assembly across the surface of the disk in a direction generally transverse to the data tracks.

In recent years, as disk storage capacity increased, the flying height of the head above the data tracks has been lowered. As the density of disk data increases, flying height must be lowered to accurately read and write the magnetic flux transitions. While the disk is rotating at a high speed, a uniform spacing needs to be maintained between the disk and the head. If the disk has a deformation, it is difficult to accurately read from or write data to the disk. In some situations, the data on the disk may be destroyed by contact between the head and the disk.

Therefore, to accurately read from and write data to the disk, it is required that the disk be kept flat and that the curvature of the disk fall within a predetermined range. The disk needs to be affixed to the spindle while maintaining the flatness and curvature of the disk within the predetermined range.

To affix a disk to the spindle, screws are used to fasten a clamp to the spindle, and the clamp applies a force against the disk. A plurality of disks requires a considerable amount of axial force to be completely affixed. However, if the force on the disks is too large, the disks will deform or distort. Therefore, an improvement is needed in the apparatus for affixing the disks to the spindle to eliminate undesirable deformation as described above.

SUMMARY OF THE INVENTION

To overcome the limitations in the prior art as described above, and to overcome other limitations that will become apparent upon reading and understanding the present specification, the present invention discloses a method and apparatus for affixing one or more disks to a spindle in a magnetic disk drive.

The present invention solves the above-described problems by providing a clamp which affixes a disk to a spindle in a magnetic disk drive, in which the clamp surface surrounding an insertion hole is stepped. When a screw is inserted into the insertion hole and tightened, a gap is formed between the screw and the clamp, which thereby reduces the amount of surface area of the screw head in contact with the clamp surface and provides a non-contact area between the screw and the clamp surface.

In accordance with the present invention, a disk drive rotates a substantially circular recording medium, a disk. While flying over the disk, a head reads a prerecorded signal from a track or writes a signal to the track on the disk. A motor rotates the spindle. At least one disk is affixed to the spindle and integrally rotates with the disk. At one end of the spindle, a clamp affixes the disk to the spindle. To affix the disks, a plurality of screws fasten the clamp to the spindle. The area surrounding the insertion holes on the clamp has a stepped surface so that a gap remains between the screws and the clamp surface after the screws are tightened. In addition, the step is formed so that the area surrounding the insertion holes nearest the spindle contacts the screws and the area surrounding the insertion holes furthest from the spindle does not contact the screws.

In typical clamps, the clamp contacts the entire bottom surface of the screw head. In contrast, the present invention provides a gap so that the bottom of the screw head partially contacts the clamp, and therefore a portion of the bottom of the screw head does not contact the clamp surface.

These and various other advantages and features of novelty which characterize the invention are pointed out with particularity in the claims annexed hereto and form a part hereof. However, for a better understanding of the invention, its advantages and the objectives obtained by its use, reference should be made to the drawings which form a further part hereof, and to the accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DESCRIPTION OF THE PREFERRED EMBODIMENTS

Figure 1:
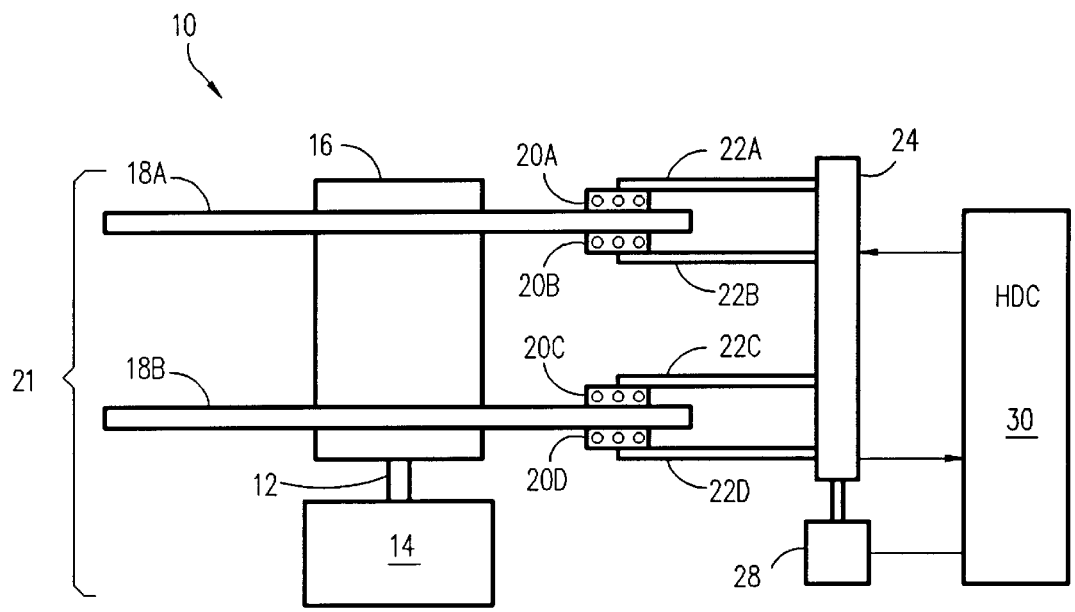
FIG. 1 illustrates a magnetic storage system according to the present invention.

FIG. 1 is an example of a typical magnetic storage system 10. A magnetic storage system 10 comprises a disk assembly 21, and a hard disk controller (HDC) 30 having a local central processing unit (CPU). The disk assembly has a disk driver (hereinafter referred to as a spindle motor) 14 which rotates a shaft 12 at high speed. A cylindrical spindle 16 is axially aligned with and is attached to the shaft 12. One or more disks 18A and 18B are affixed to the outer surface of the spindle 16 at a predetermined spacing. When the spindle motor 14 rotates the shaft 12, the disks 18A and 18B rotate integrally with the spindle 16.

Each head 20A to 20D faces a disk surface. The access arms 22A to 22D support and position the heads 20A to 20D respectively. The access arms 22A to 22D attach to a signal transducer driver (hereinafter referred to as an actuator) 28 through a shaft 24. The shaft 24 rotates to position the heads 20A to 20D over predetermined locations on the disk (tracks). The spindle motor 14 and actuator 28 connect to the HDC 30, which controls the number of revolutions, speed and the like of the disks. The HDC 30 may be connected to a host.

Figure 2:
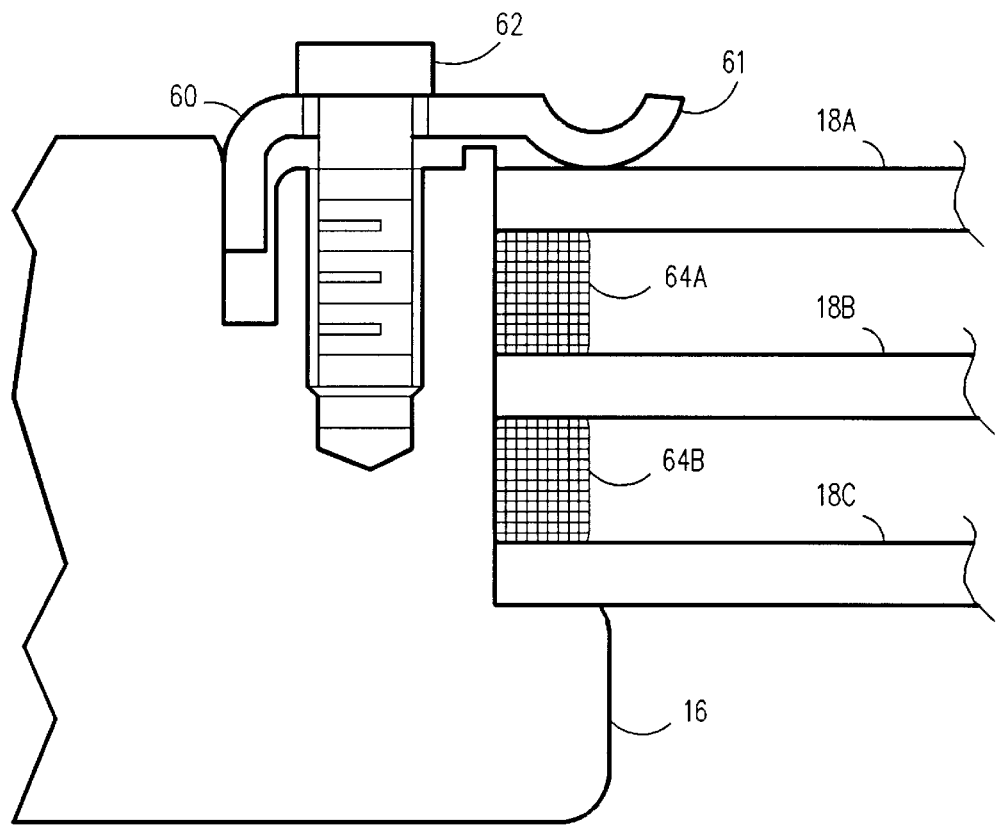
FIG. 2 is a partial sectional view of the typical apparatus found in the prior art for affixing disks to a spindle in a magnetic storage system.

FIG. 2 is a partial sectional view of a typical apparatus found in the prior art for affixing disks to a spindle. A clamp 60 affixes the disks 18A, 18B, and 18C to the spindle 16 using a screw 62 to press the clamp 60 against the spindle 16. When the screws 62 are tightened, a force is applied to the disks 18A, 18B and 18C which affixes the disks to the spindle 16. A curved portion 61 is formed in the outer peripheral surface of the clamp 60. The curved portion 61 applies a force to the disk 18A to affix the disks. Spacers 64A and 64B, sandwiched between the disks, maintain uniform disk spacing.

Figure 3:
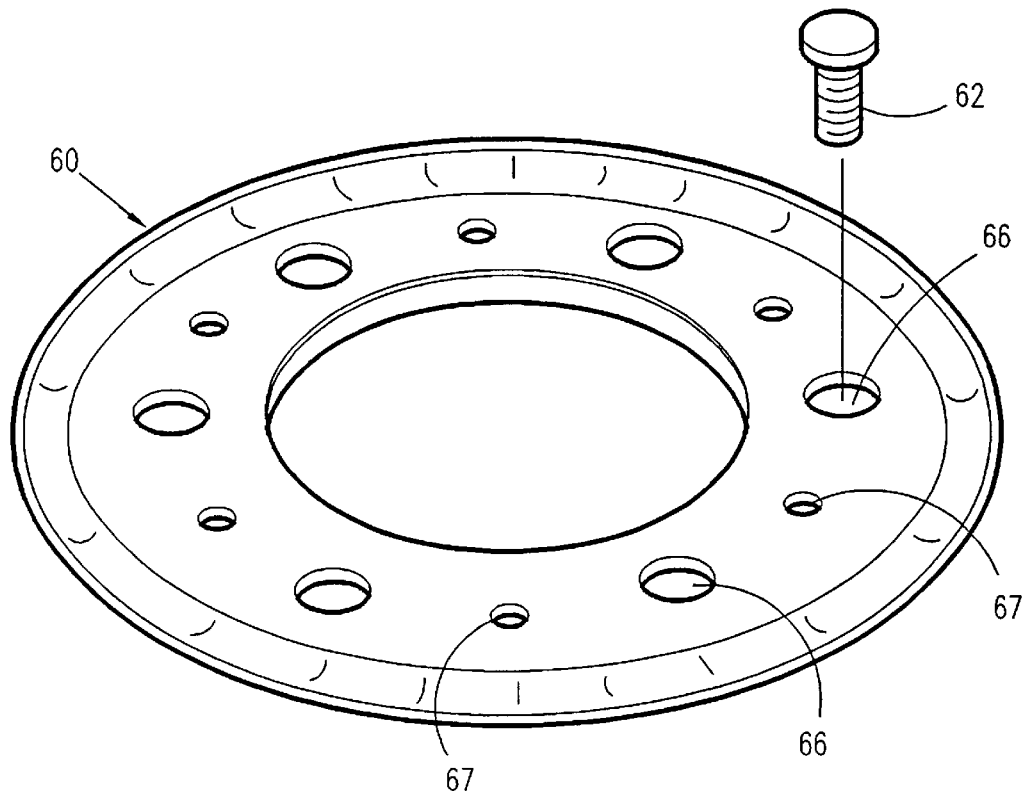
FIG. 3 is a perspective view of the prior art clamp shown in FIG. 2.
Figure 4:
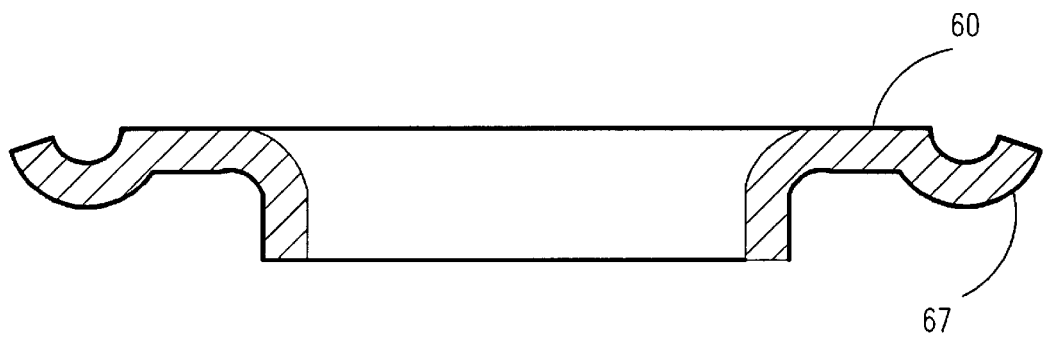
FIG. 4 is a sectional view of the prior art clamp shown in FIG. 2.
Figure 5:
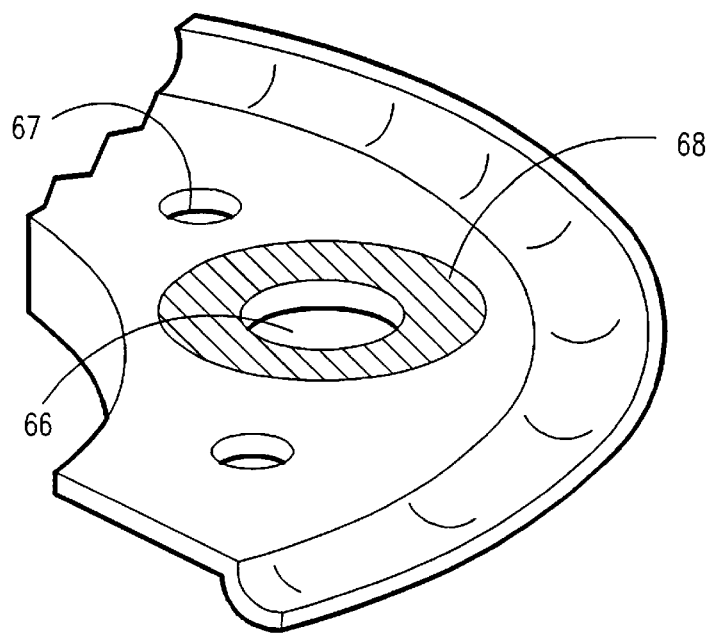
FIG. 5 is a partial view of the prior art clamp shown in FIG. 2.

FIGS. 3 and 4 are perspective and sectional views of a prior art clamp 60 found in a typical disk drive. FIG. 5 is a partially enlarged view of the area surrounding an insertion hole. As shown in FIG. 3, a plurality, six in this example, of insertion holes 66 are formed in the clamp 60. Screws are inserted into the insertion holes 66 and fastened to the spindle. Small holes 67 on either side of the insertion holes 66 are provided for an assembling tool. FIG. 4 shows the curved portion 61 of the outer peripheral edge of the clamp 60 which applies a force to the disk to affix it. The bottom of the screw head contacts the clamp 60 to press the clamp 60. FIG. 5 shows the contact area (pressing area) 68 between the screw and the clamp 60. The entire bottom surface of the screw head contacts and applies a force to the clamp 60.

Figure 6:
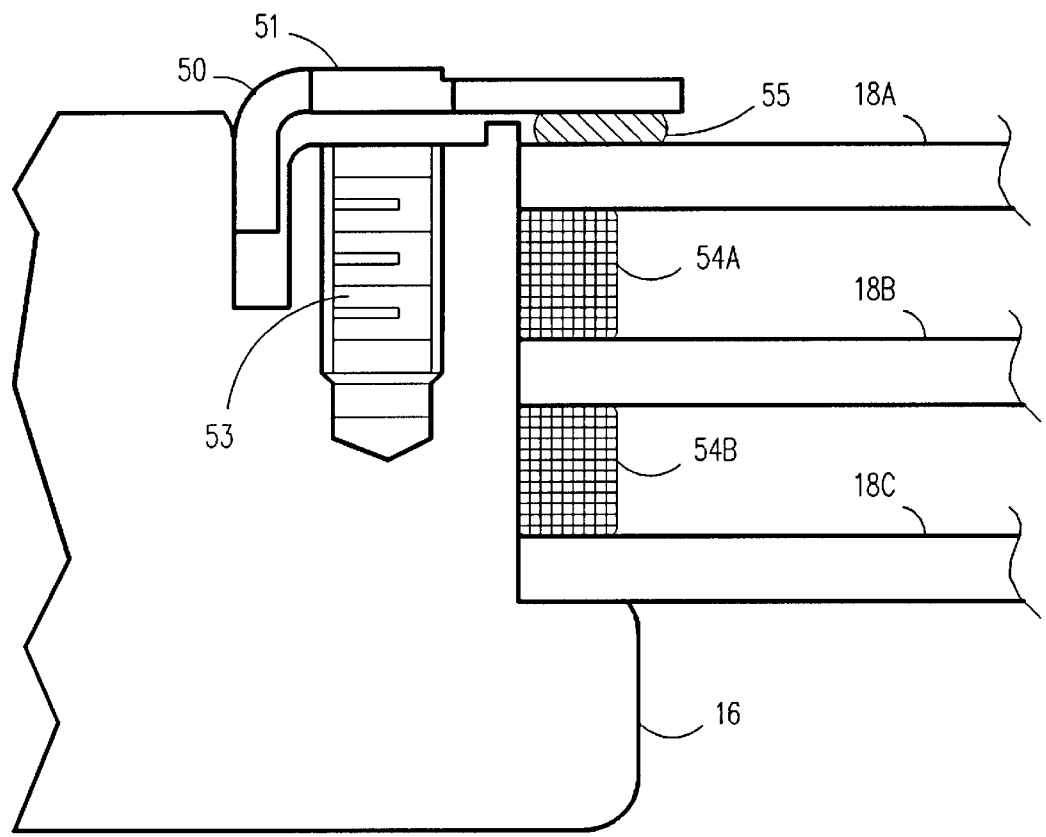
FIG. 6 is a partial sectional view of an apparatus for affixing disks to a spindle according to the preferred embodiment of the present invention.
Figure 7:
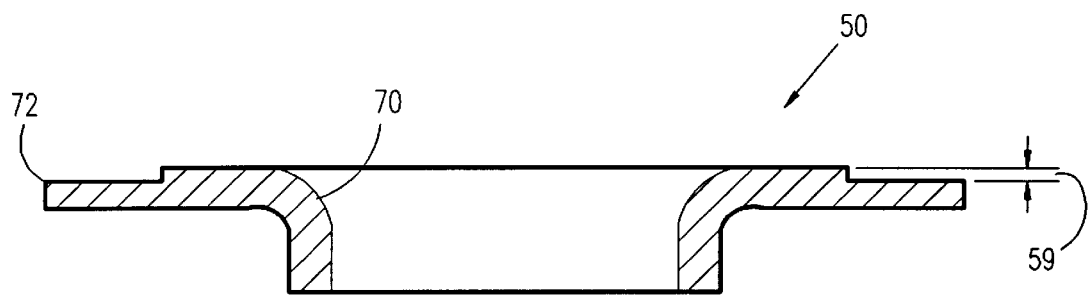
FIG. 7 is a sectional view of the clamp according to the preferred embodiment of the present invention.
Figure 8:
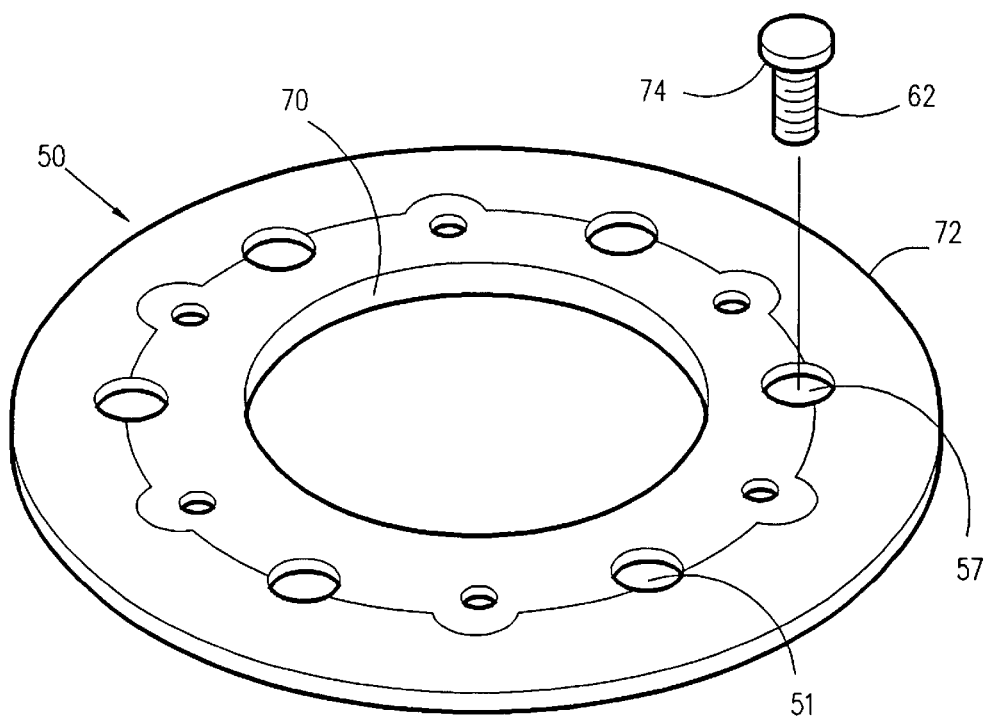
FIG. 8 is a perspective view of the clamp according to the preferred embodiment of the present invention.
Figure 9:
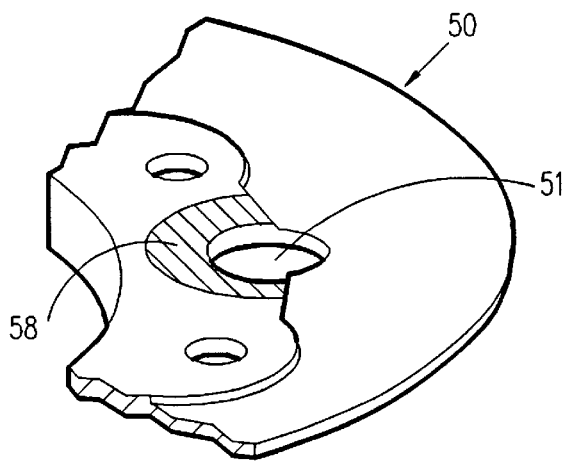
FIG. 9 is a partial view of the clamp according to the preferred embodiment of the present invention.

Now referring to FIGS. 6 to 9, the apparatus for affixing disks according to the preferred embodiment of the present invention is explained. FIG. 6 is a sectional view showing the positional relationship between the disks 18A, 18B, 18C, spindle 16, and clamp 50 when they are affixed. FIG. 7 is a sectional view of a clamp 50 according to the preferred embodiment of the present invention. FIG. 8 is a perspective view of a clamp 50 according to the preferred embodiment of the present invention. FIG. 9 is a partial view of a clamp 50 showing the area surrounding insertion hole 51 according to the preferred embodiment of the present invention.

In FIG. 6, a clamp 50 has insertion hole 51. Clamp 50 is positioned so that the insertion hole 51 of the clamp 50 is aligned with the insertion hole 53 of the spindle 16. A J-ring 55 is sandwiched between the clamp 50 and the disk 18A. When the clamp 50 is screwed to the spindle, the screws cause the clamp 50 to apply a force to the disks 18A, 18B, 18C through the J-ring 55, thereby affixing the disks 18A, 18B, 18C to the spindle 16. The clamping force is uniformly transmitted to the disk 18A through the J-ring 55. The J-ring 55 is an annular member. Typically, the J-ring 55 is made of aluminum if the disks are aluminum, so that the J-ring 55 and disks 18A, 18B, 18C have similar thermal linear expansion coefficients. If the disks are made of glass, the J-rings 55 are stainless steel or ceramic.

Spacers 54A and 54B are sandwiched between the disks 18A, 18B, 18C to maintain a uniform spacing between the disks 18A, 18B, 18C. The spacers 54 are machined with high precision, as is the J-ring, to keep the disks parallel. The spacers 54 are formed from aluminum or similar material.

FIG. 7 is a sectional view of the clamp 50 according to the present invention. Insertion hole 51 is formed in the clamp 50, and a step 59 is formed in the surface surrounding the screw insertion end of the insertion hole 51. The step 59 is formed by reducing the thickness of the outer portion 72 of the clamp 50. A gap is formed between the thin outer portion 72 of the clamp and the bottom of the screw head 74 when a screw is fastened through the insertion hole 51.

In FIG. 8, a perspective view of the clamp 50 of the present invention is shown. As previously described, the inner portion 70 of the clamp is thicker than (raised with respect to) the outer portion 72 of the clamp. Assuming that the circumference of a circle passes approximately through the center of the insertion hole 51, the portion of the clamp inside the circle is thicker than the portion of the clamp outside the circle, thus forming a step 59.

FIG. 9 shows a partially enlarged view of the area surrounding the insertion hole 51. In the clamp 50, a plurality of insertion holes 51 are formed. In a preferred embodiment, six insertion holes 51 are formed about the clamp 50. In alternative embodiments, there may be more or less insertion holes 51 without departing from the scope of the invention. Screws are inserted in the insertion holes 51 and tightened against the spindle 16. The bottom of the screw head 74, shown in FIG. 8, contacts the clamp 50 surface to apply a force to the clamp 50. In FIG. 9, the shaded area 58 represents the contact area between the screw 62 and the clamp 50. The bottom of the screw head 74 contacts the clamp 50 not in whole but in part to apply a force to the clamp 50. In other words, the screw 62 contacts the clamp 50 surface only in the thick portion 70 of the clamp 50. A gap is formed between the screw 62 and the thinner portion 72 of the clamp 50.

The fastening of the screw 62 produces a distortion in the clamp area nearest the screw's center. However, because the clamp 50 has a thin outer portion 72 and the force of the screw 62 is applied only to the inner portion of the insertion hole 51 (contact area 58 of FIG. 9), the distortion in the outer portion 72 of the clamp more easily diffuses. Therefore, the force applied to the J-ring 55 from the clamp 50 becomes more uniform. Accordingly, disk distortion and deformation decreases. It is preferable, for stability, that approximately half of the area of the bottom of the screw head 74 contact the shaded area 58 surrounding the insertion hole 51 nearest the clamp's center.

Figure 10:
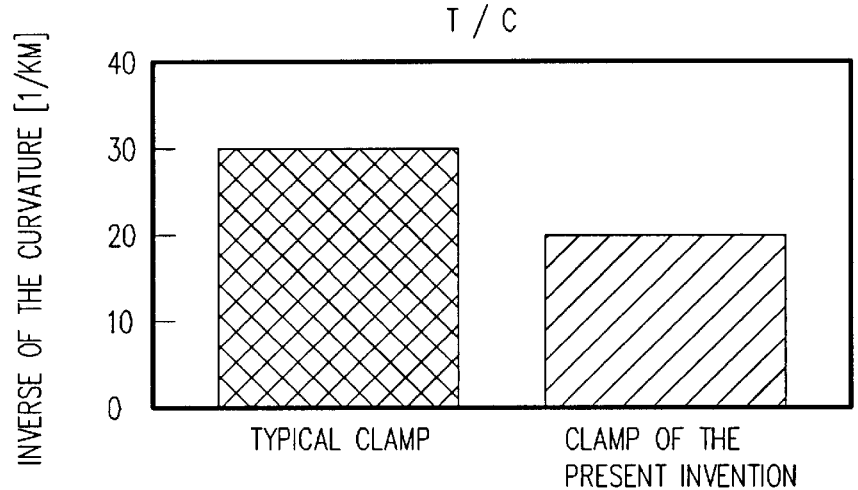
FIG. 10 is a graph comparing the amount of measured distortion along the disk's circumference.
Figure 11:
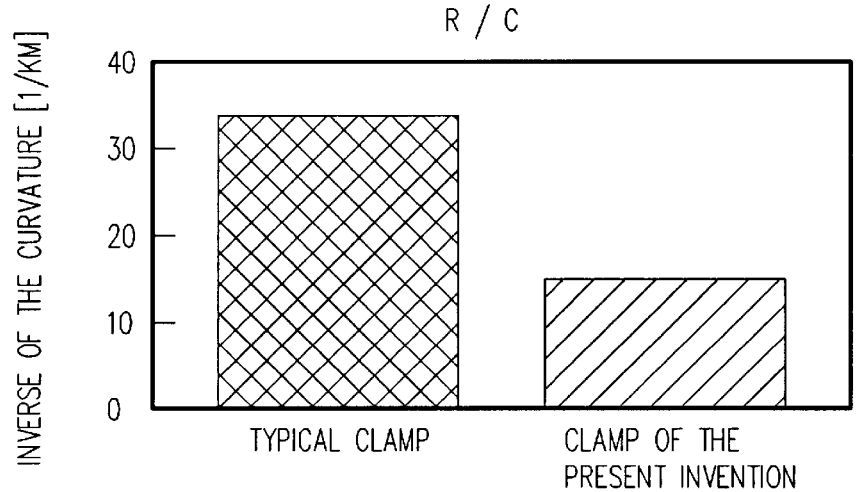
FIG. 11 is a graph comparing the amount of measured distortion along the disk's radius.

FIGS. 10 and 11 show the results of a quantitative analysis of the amount of distortion of a disk between use of a clamp apparatus found in the prior art and the apparatus in accordance with the present invention. FIG. 10 shows the inverse of curvature along the disk's circumference. FIG. 11 shows the inverse of curvature along the disk's radius. The amount of distortion decreases as the inverse of curvature decreases. In both figures, the right bar represents the result obtained by the clamp according to the present invention and the left bar represents the result obtained by a typical clamp. The clamp according to the present invention has a smaller inverse of curvature than the typical clamp, thus indicating that the clamp according to the present invention has less distortion. These results are based on a measurement of interference fringes by a laser beam under the following conditions: the number of disks is 3; the disk material is aluminum; and the screw torque is 3.5 kgf·cm.

Therefore, according to the present invention and as shown in FIGS. 9 and 10, disks 18A, 18B can be affixed to a spindle 16 while reducing disk distortion and deformation.

The foregoing description of the preferred embodiment of the invention has been presented for the purposes of illustration and description. It is not intended to be exhaustive or to limit the invention to the precise form disclosed. Many modifications are possible in light of the above teaching. It is intended that the scope of the invention be limited not with this detailed description but rather by the claims appended hereto.

We claim:

1. An apparatus for affixing a disk to a spindle in a data recording disk drive comprising:

a flat ring-shaped clamp having an upper surface, a lower surface, and a spindle hole extending therethrough, said clamp further comprising an inner diameter about said spindle hole, an outer diameter about the periphery of the clamp, a middle diameter located between said outer diameter and inner diameter, and a step located on the middle diameter of said clamp such that the distance from the lower surface to the upper surface from the middle diameter to the outer diameter of the clamp is less than the distance from the lower surface to the upper surface from the inner diameter to the middle diameter of the clamp; and at least one screw insertion hole located on said middle diameter wherein at least a portion of the clamp defining the circumference of said at least one screw insertion hole has a greater thickness, measured from the lower surface to the upper surface, from the middle diameter to the outer diameter, than a thickness of at least a portion of the clamp defining the circumference of said at least one screw insertion hole, measured from the lower surface to the upper surface, from the middle diameter to the outer diameter.

2. The apparatus as in claim 1, wherein the screw insertion hole is located on said middle diameter such that the area surrounding said insertion hole nearest said spindle hole is raised higher than the area surrounding said insertion hole nearest the peripheral edge of said clamp.

3. The apparatus as in claim 1, wherein the screw insertion hole is circular and is located on said middle diameter such that one-half the circumference of the screw insertion hole located nearest the spindle hole is raised.

4. A magnetic storage system comprising:

a disk with a data surface of concentric data tracks;

a spindle supporting said disk, said spindle for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator comprising a forward portion for supporting said slider, a central portion rotatably supported by a rotational shaft through a bearing and a v-shaped rearward portion;

an electronics module for processing data read from and written to the data surface;

a suspension for connecting said slider to said actuator;

a flat ring-shaped clamp for affixing said disk to said spindle, said clamp comprising an upper surface, a lower surface, and a spindle hole extending therethrough, said clamp further comprising an inner diameter about said spindle hole, an outer diameter about the periphery of the clamp, a middle diameter located between said outer diameter and inner diameter, and a step located on the middle diameter of said clamp such that the distance from the lower surface to the upper surface from the middle diameter to the outer diameter of the clamp is less than the distance from the lower surface to the upper surface from the inner diameter to the middle diameter of the clamp; and at least one screw insertion hole located on said middle diameter; wherein at least a portion of the clamp defining the circumference of said at least one screw insertion hole has a greater thickness, measured from the lower surface to the upper surface, from the middle diameter to the outer diameter, than a thickness of at least a portion of the clamp defining the circumference of said at least one screw insertion hole, measured from the lower surface to the upper surface, from the middle diameter to the outer diameter.

5. The magnetic storage system as in claim 4, wherein the screw insertion hole is located on said middle diameter such that the area surrounding said insertion hole nearest said spindle hole is raised higher than the area surrounding said insertion hole nearest the peripheral edge of said clamp.

6. The magnetic storage system as in claim 4, wherein the screw insertion hole is circular and is located on said middle diameter such that one-half the circumference of the screw insertion hole located nearest the spindle hole is raised.

7. A method for affixing a disk to a spindle in a data recording disk drive, said method comprising the steps of:

mounting a disk about a spindle shaft in a disk drive assembly;

placing a j-ring about the spindle shaft in the disk drive assembly such that the j-ring contacts and rests about the inner diameter of the disk;

placing a flat ring-shaped clamp about the spindle shaft over the j-ring, said clamp having a step located about a middle diameter of the clamp located between the inner diameter and outer diameter of the clamp such that the portion of the clamp between the middle diameter and outer diameter of the clamp is thinner than the portion of the clamp between the inner diameter and middle diameter; and inserting a screw through a screw hole in the middle diameter of the clamp such that a lower surface of the screw head contacts the clamp in the area around the screw hole nearest the spindle while a gap is formed between the lower surface of the screw head and the area around the screw hole farthest from the spindle shaft wherein at least a portion of the clamp defining the circumference of said screw hole has a greater thickness, measured from a lower surface of the clamp to an upper surface of the clamp, from the middle diameter to the outer diameter, than a thickness of at least a portion of the clamp defining the circumference of said screw hole, measured from the lower surface to the upper surface, from the middle diameter to the outer diameter, such that a step of tightening the screw produces a larger force through the clamp at a portion of the clamp between the middle diameter to the inner diameter than a force through the clamp between the middle diameter and the outer diameter.

8. The method as in claim 7, further comprising tightening the screw in the screw hole such that a force is applied through the clamp and j-ring to the disk at the inner diameter of the disk and not the outer diameter of the disk.

9. The method as in claim 7, wherein the screw insertion hole is circular and is located on the middle diameter of the clamp such that one-half the circumference of the hole nearest the spindle shaft is raised.

* * * * *

UNITED STATES PATENT AND TRADEMARK OFFICE
CERTIFICATE OF CORRECTION

PATENT NO. : 5,822,151
DATED : October 13, 1998
INVENTOR(S) : Albrecht et al.

It is certified that error appears in the above-indentified patent and that said Letters Patent is hereby corrected as shown below:

Claim 1, column 5, line 44, delete "middle" and insert -- inner --

Claim 1, column 5, line 45, delete "outer" and insert -- middle --

Claim 4, column 6, line 29, delete "middle" and insert -- inner --

Claim 4, column 6, line 30 delete "outer" and insert -- middle --

Claim 7, column 7, line 2 delete "middle" and insert -- inner --

Claim 7, column 7, line 3 delete "outer" and insert -- middle --

Signed and Sealed this

Twenty-eighth Day of March, 2000

Attest:

Q. TODD DICKINSON

*Attesting Officer*   *Commissioner of Patents and Trademarks*